United States Patent [19]
Mori

[11] Patent Number: 4,565,185
[45] Date of Patent: Jan. 21, 1986

[54] FOUNDATION FOR MOUNTING SOLAR RAY COLLECTING DEVICES

[76] Inventor: Kei Mori, 3-16-3-501, Kaminoge, Setagaya-ku, Tokyo, Japan

[21] Appl. No.: 610,712

[22] Filed: May 16, 1984

[30] Foreign Application Priority Data

Aug. 3, 1983 [JP] Japan .............................. 58-142052

[51] Int. Cl.[4] .............................................. F24J 3/02
[52] U.S. Cl. ................................ 126/417; 126/425; 126/438; 126/440; 126/451
[58] Field of Search ............... 126/438, 439, 440, 425, 126/451, 417; 350/321, 310, 289, 245

[56] References Cited

U.S. PATENT DOCUMENTS

| | | | |
|---|---|---|---|
| 3,884,217 | 5/1975 | Wartes | 126/438 X |
| 3,892,433 | 7/1975 | Blake | 126/425 |
| 4,064,865 | 12/1977 | Depew | 126/440 X |
| 4,137,897 | 2/1979 | Moore | 126/451 X |
| 4,195,620 | 4/1980 | Rust | 126/439 X |
| 4,333,446 | 6/1982 | Smyth | 126/438 |
| 4,380,996 | 4/1983 | Mengeringhauser | 126/451 X |
| 4,409,963 | 10/1983 | Mori | 126/440 |

Primary Examiner—Larry Jones
Attorney, Agent, or Firm—Jordan and Hamburg

[57] ABSTRACT

A foundation has steps for mounting a large number of solar ray collecting devices. The steps have an approximately equilateral polygonal configuration, for instance, triangular, hexagonal, and the like and have an apex at their forward position. The solar ray collecting device is mounted on each of the polygonal steps, and the entire structure moves rotatably following the movement of the sun.

3 Claims, 11 Drawing Figures

FOUNDATION FOR MOUNTING SOLAR RAY COLLECTING DEVICES

BACKGROUND OF THE INVENTION

The present invention relates to a foundation for mounting a large number of solar ray collecting devices which are arranged in a concentrated manner.

The present applicant previously proposed a solar ray collecting device having a cylindrical basic portion or foundation and a transparent dome-shaped head. Such a solar ray collecting device is accommodated in a capsule constructed with a foundation and a head when in use. The device contains one or more lenses, a solar ray direction sensor, rotating shafts, motors, a supporting frame, and a supporting arm.

Recently, demand for such a device has increased greatly. Often a plurality of such devices have to be installed on the rooftop or the roof garden of a building. However, the space thereon is often limited and it may be impossible to completely satisfy the demand of the customers by simply installing many solar ray collecting devices. Furthermore, in the morning or in the evening, the front solar ray collecting device projects a shadow toward the rear one. It follows from that fact that the high efficiency of solar ray collection cannot be sufficiently maintained. It is one of the important problems to be solved with respect to the prior art technology.

SUMMARY OF THE INVENTION

The present invention was performed in consideration of the above-mentioned situation. In particular, a primary object of the present invention is to provide a foundation for mounting a large number of solar ray collecting devices within a small space.

The value of the present invention will become more fully apparent from the following detailed description thereof taken in conjunction with the accompanying drawings.

BRIEF DESCRIPTION OF THE DRAWINGS

FIG. 2 is a front view;

FIG. 3 a back view;

FIG. 4 is a side view;

FIG. 5 (A) is a plane view;

FIG. 5 (B) is a bottom view; and

FIG. 6 is a perspective view.

FIG. 7 is a perspective view;

FIG. 8 is a plane view;

FIG. 9 is a front view; and

FIG. 10 is a side view.

DESCRIPTION OF THE PREFERRED EMBODIMENTS

While the foundation of the present invention can be changed into numerous other kinds of physical embodiments, depending upon the environment and other requirements for its use, substantial numbers of those already described have been made, tested and used. All of them have performed in an eminently satisfactory manner.

Before entering into a detailed description of the present invention, a brief reference will be made to a prior art solar ray collecting device shown in FIG. 1.

Figure 1:
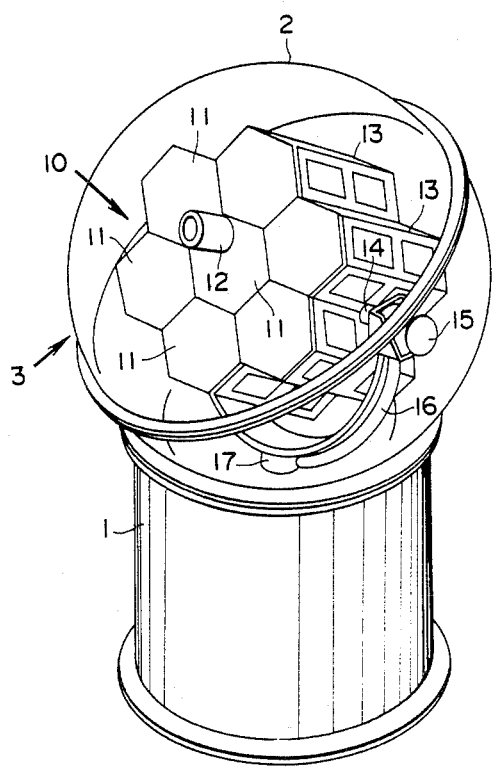
FIG. 1 is a perspective view showing a prior art solar ray collecting device which was previously proposed by the present applicant.

FIG. 1 is a perspective view showing an embodiment of the solar ray collecting device previously proposed by the present applicant. In FIG. 1 is a cylindrical foundation, 2 is a transparent dome-shaped head, and 3 is a capsule constructed with those elements appropriate for use with a solar ray collecting device. When the device is used, a solar ray collecting device 10 is accommodated in the capsule 3 as is shown in FIG. 1.

The solar ray collecting device 10 contains one or more lenses 11 (for example, 7 or 19) for focusing the sun's rays; a solar ray direction sensor 12 for detecting the direction of the sun; a supporting frame 13 for unitarily supporting the lenses and the sensor; a first rotating shaft 14 for rotatably moving the support frame 13; a first motor 15 for rotating the first rotating shaft 14; a supporting arm 16 for supporting the lenses 11, the sensor 12, the frame 13, the shaft 14, and the motor 15; a second rotating shaft 17 arranged so as to cross perpendicularly to the first rotating shaft 14; and a second motor (not shown in FIG. 1) for rotating the second rotating shaft 17. The solar ray direction sensor 12 detects the direction of the sun and produces a detection signal which controls the afore-mentioned motors so as to always direct the lens (or lenses) 11 toward the direction of the sun. The solar rays focused by the lens 11 are guided into an optical conductor cable (not shown in the drawing), the light-receiving edge of which is arranged at the focal position of the lens 11, and transmitted to an optional desired position through the optical conductor cable.

The demand for solar ray collecting devices as described above has increased in recent years. On some occasions, it has been necessary for a plurality of such devices to be installed on rooftops of buildings. However the space on such rooftops is limited and it may sometimes be impossible to completely satisfy the demand of customers by simply installing a large number of such solar ray collecting devices. Furthermore, in the morning or in the evening, the location of the sun is low so that the front solar ray collecting device projects a shadow toward the rear solar ray collecting device. As a result, the high efficiency of the solar ray collecting device cannot be sufficiently maintained. Such a problem ought to be solved with respect to the prior art technology.

Hereinafter will be described preferred embodiments of the present invention which are free from the drawbacks already discussed above.

Figure 2:
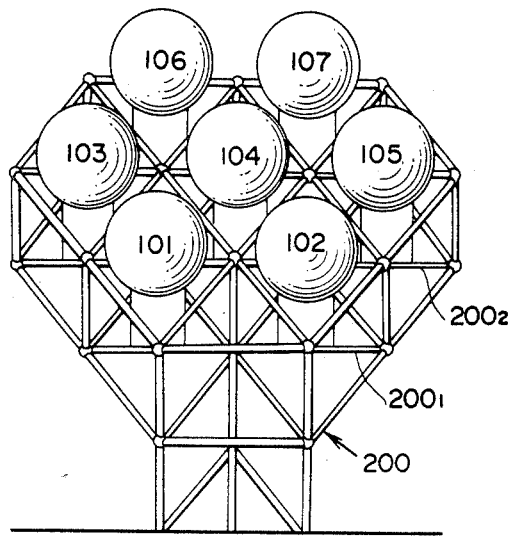
FIGS. 2 through 6 are figures describing an embodiment of a foundation for mounting solar ray collecting devices according to the present invention.
Figure 3:
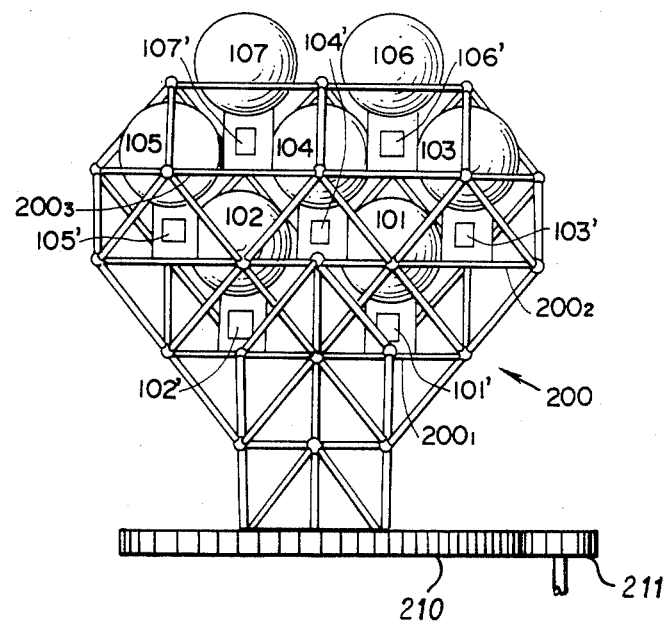
Figure 4:
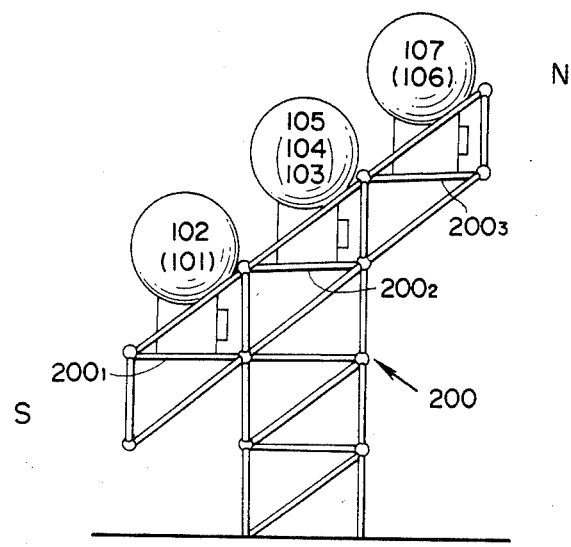
Figure 5:
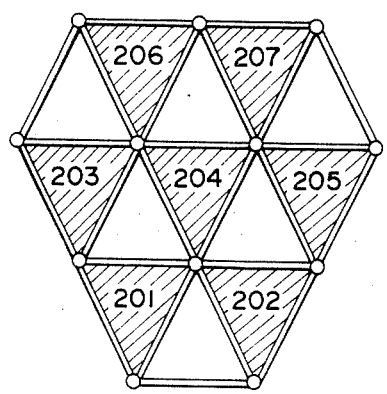
Figure 5:
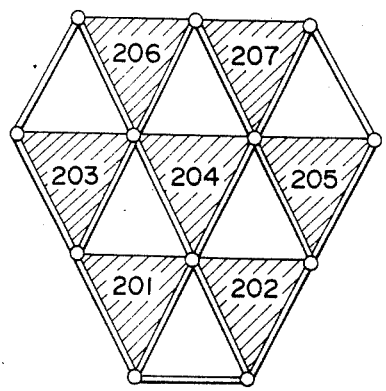
Figure 6:
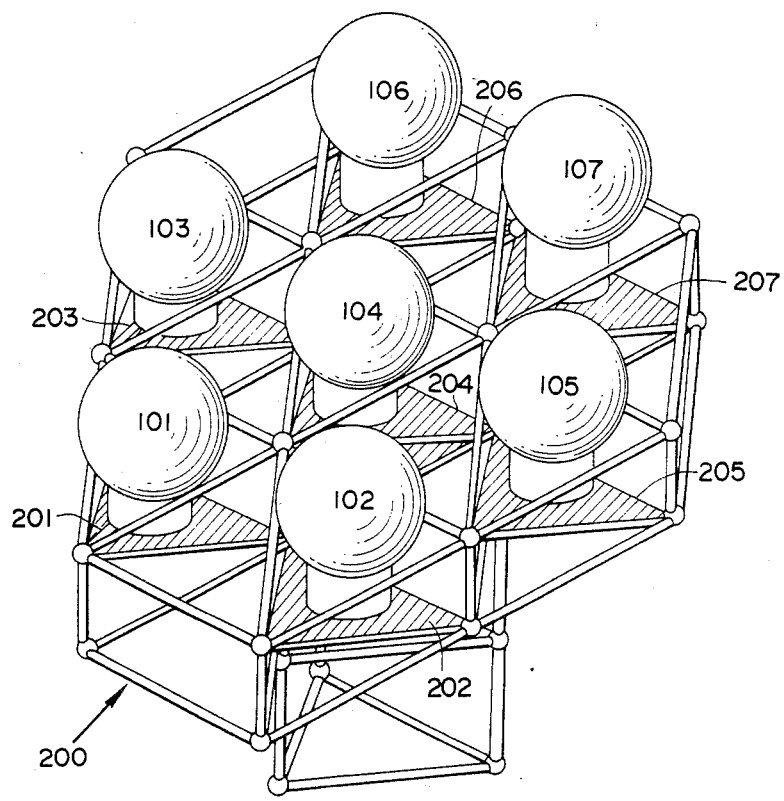

FIGS. 2 through 6 show an embodiment of a foundation of entraining solar ray collecting devices wherein FIG. 2 is a front view; FIG. 3 is a back view; FIG. 4 is a side view; fIG. 5 (A) is a plane view; FIG. 5 (B) is a bottom view; and FIG. 6 is a perspective view. In the drawings, 101 through 107 are solar ray collecting devices as described above; and 200 is a foundation for mounting large numbers of solar ray collecting devices as mentioned earlier according to the present invention.

The foundation 200 is constructed so as to move with the sun. For example, gears 210 and 211 shown in FIG. 3 may move the foundation 200 to follow the sun.

In the case of the embodiments as shown in those figures, the foundation 200 for mounting the solar ray collecting devices is constructed in the shape of stairway consisting of three steps $200_1$, $200_2$ and $200_3$. On the respective steps, mounting bases 201 through 207 are installed and are each shaped like an equilateral triangle having an apex facing in the forward direction. The solar ray collecting devices 101 through 107 are mounted on the respective mounting bases 201 through 207 as shown in the figures, and the entire structure can be rotatably moved following the movement of the sun.

The difference in height between the respective stpes is set so as to be at least approximately equal to the diameter of the light-receiving surface of the solar ray collecting device. Consequently, the respective solar ray collecting devices do not project any shadow toward the rear solar ray collecting device so that the rear solar ray collecting devices can effectively collect the solar rays. Furthermore, the afore-mentioned solar ray collecting devices have doors 101' through 107' for use as an entrance and as an exit so that various adjustments can be made by a worker upon obtaining access through the doors. The adjustment mechanism provides contain the ability to position the light-receiving edge of the optical conductor cable at the location of the lens focus. Such adjustment is performed while the solar ray collecting device is in use so that it may be necessary to do the adjustment facing in a southerly direction. For this reason, the door as entrance and exit has to be installed at the northern side of the device.

In such a manner, since the solar ray collecting device has the door as entrance and exit at the northern side thereof, the foundation for mounting the solar ray collecting device requires a wider space at the northern side than on the other side.

Therefore, each of the mounting bases 201 through 207 is preferably constructed in the shape of approximately equilateral (regular) triangle having an apex at its forward position (i.e. southern side).

In addition, although the figures show an embodiment of the foundation for mounting seven solar ray collecting devices, the present invention does not limit the scope thereof within the above-mentioned embodiment. For instance, it may be possible to construct the mounting foundation as consisting of three bases: 201, 202 and 204; or 204, 206 and 207. Besides, it may also be possible to construct it as consisting of five bases: 201 through 205, or 203 through 207. Furthermore, it may be possible to construct the mounting foundation to comprise more bases than that shown in the figures.

Figure 7:
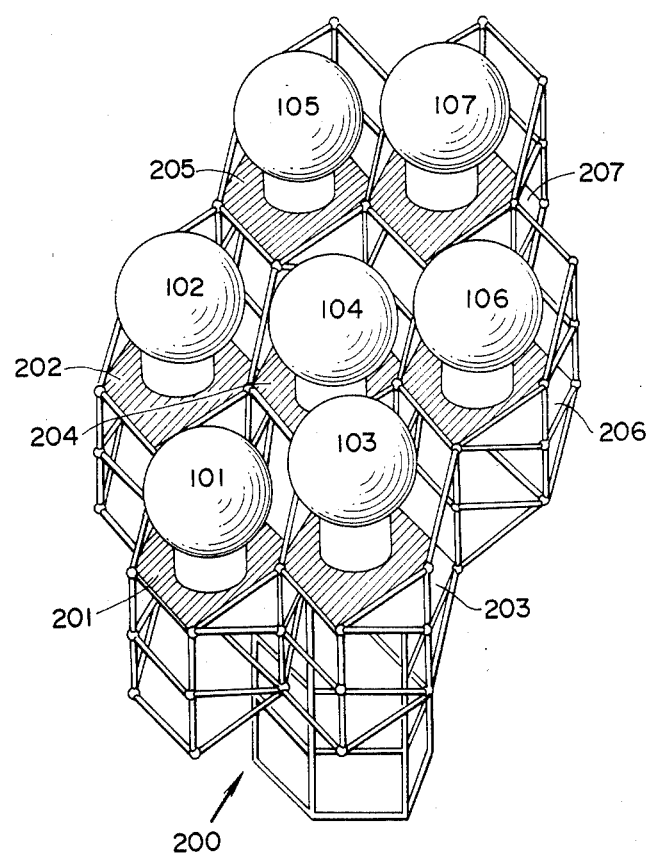
FIGS. 7 through 10 show another embodiment of the present invention.
Figure 8:
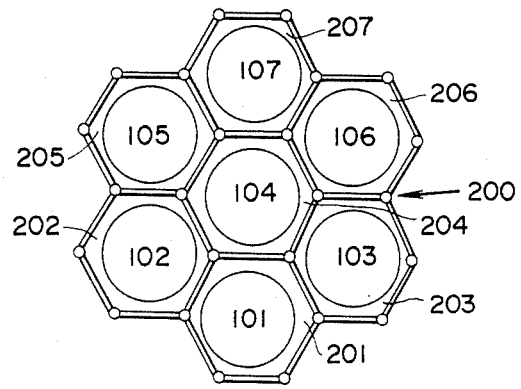
Figure 9:
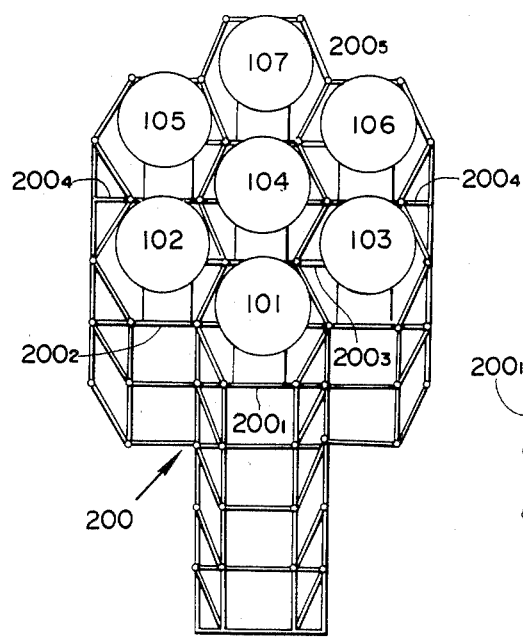
Figure 10:
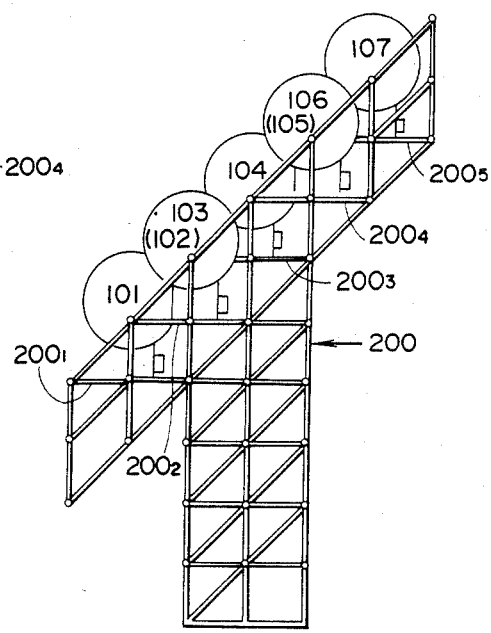

FIGS. 7 through 10 are figures showing another embodiment of the present invention. FIG. 7 is a perspective view; FIG. 8 is a plane view; FIG. 9 is a front view; and FIG. 10 is a side view. In the figures, 101 through 107 are solar ray collecting devices; 200 is a foundation for mounting the solar ray collecting devices that are capable of being moved rotatably; and 201 through 207 are bases for mounting the respective solar ray collecting devices.

In the case of the embodiment shown in FIGS. 7 through 10, each of the respective mounting bases is constructed in the shape of an approximately equilateral hexagon. In this embodiment, seven solar ray collecting devices are mounted on the entire foundation 200 having a stair consisting of five steps. The device 101 is mounted on the first step, 102 and 103 on the second step, 104 on the third step, 105 and 106 on the fourth step, and 107 on the fifth step. Furthermore, it may be possible to install other foundations so as to mount a larger number of solar ray collecting devices. Especially, in the embodiment shown in FIGS. 7 through 10, the other devices are arranged almost concentrically around the device 104 located at the central portion, so that the weight of the load is quite well balanced around the center. It may be preferable in this case to construct a foundation for mounting the solar ray collecting devices in the shape of a tower. Moreover, in the embodiment shown in the figures, the height difference between the vertical rows, for instance, 102 and 105, 101 and 104, 104 and 107, or 103 and 106 may be preferably set so as to be at least nearly equal to the diameter of the light-receiving surface of the solar ray collecting device. Furthermore, it will be easily understood why the door for use as entrance and exit should be installed at the northern side in a preferred embodiment.

As is apparent from the afore-mentioned description, by utilizing a narrow space efficiently, a large number of solar ray collecting devices can be arranged more effectively.

In summary it will be seen that the present invention makes possible a more efficient solar ray collecting device. The present invention, as shown and described heretofore, is only illustrative of what is possible. The present invention can be modified for making other types of foundations as well.

Various modifications will become apparent by those skilled in the art after receiving the teachings of the present disclosure without departing from the scope thereof.

What this claim is:

1. A support foundation comprising a support structure means operable to move to follow the sun, said support structure means having structural step parts forming a plurality of steps disposed at different elevations, said support structure further comprising an underlying structure supporting said structural step parts, said underlying structure being generally centrally disposed relative to said structural step parts so as to provide a generally balanced load on said underlying structure, each of said steps having at least one base, a solar ray collector mounted on each of said bases, each of said solar ray collectors having a light-receiving surface, each of said base having an equilateral polygonal configuration, said bases in adjacent steps being vertically spaced from one another at a distance at least as great as the vertical height of said light-receiving surface so as to preclude having the shadow of a solar ray collector projecting on a rearwardly disposed solar ray collector, said bases on said one step being horizontally positioned between the bases on the next higher step so as to provide for alternately staggered solar ray collectors on successive steps, said light-receiving surface comprising a lens, said solar ray collector further comprising an optical conductor cable having a light-receiving edge, each of said solar ray collectors having an access door facing to the rear away from the sun to provide access for positioning said light-receiving edge of said optical conductor cable at the focus of said lens, said structural step parts extending from said base so as to free the rearwardly facing area of said base to provide for access to said door to thereby permit adjustment of said solar ray collector from the rear of the support structure away from the sun as said solar ray collector continues to unobstructedly receive solar rays from the sun.

2. A support foundation according to claim 1, wherein said equilateral polygonal configuration is a triangle.

3. A support foundation according to claim 1, wherein said equilateral polygonal configuration is a hexagon.

* * * * *